(No Model.)

R. S. PEABODY.
GUARD FOR LATHES.

No. 530,238.

Patented Dec. 4, 1894.

WITNESSES:
W. Hermann Apgar.
K. M. Gilligan.

INVENTOR
Robert Singleton Peabody
BY
Augustus B. Stoughton
ATTORNEY

UNITED STATES PATENT OFFICE.

ROBERT SINGLETON PEABODY, OF PHILADELPHIA, PENNSYLVANIA.

GUARD FOR LATHES.

SPECIFICATION forming part of Letters Patent No. 530,238, dated December 4, 1894.

Application filed May 11, 1894. Serial No. 510,849. (No model.)

*To all whom it may concern:*

Be it known that I, ROBERT SINGLETON PEABODY, a citizen of the United States, residing at the city of Philadelphia, in the county of Philadelphia and State of Pennsylvania, have invented certain new and useful Improvements in Guards for Lathes, of which the following is a specification.

Ordinarily work is held in a chuck applied to the headstock of a lathe and a tool or graver is held either in a suitable slide rest or supported by the hand of the operator upon a so-called tool-rest. In practice, it sometimes happens, especially where the work is being turned, shaped or otherwise operated upon in close proximity with the chuck, that the point or cutting edge of the tool or graver slips a little and collides with the jaws of the chuck, which, of course, are rotating rapidly, thus giving rise to injury to the jaws of the chuck, and in some instances, the graver is thrown and injures the person of the user, or causes the work to be bent.

The principal object of my present invention is to obviate the above mentioned defects and disadvantages and to prevent the graver or tool from accidentally colliding with the chuck or its jaws. In my invention use is made of a guard comprising wings suitably supported in front of the chuck and having an opening for the accommodation of the work.

The nature, characteristic features, and scope of my invention will be more fully understood from the following description taken in connection with the accompanying drawings forming part hereof, and in which—

Figure 1:
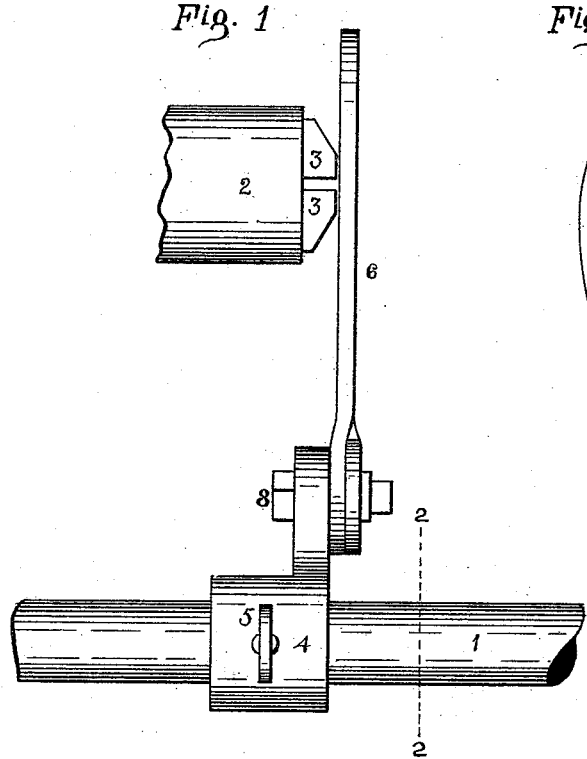
Figure 2:
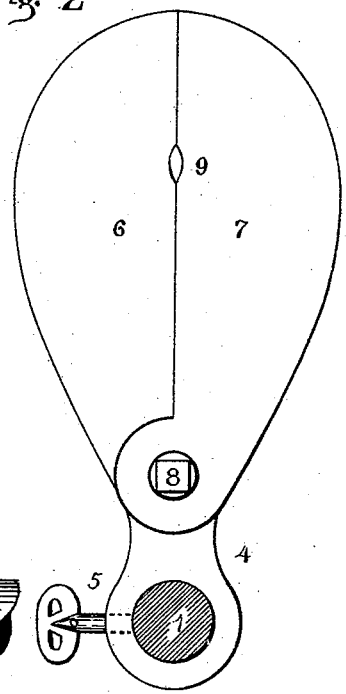

Figure 1, is a side elevational view of a guard embodying features of my invention, and Fig. 2, is a sectional view taken on the line 2—2, of Fig. 1.

In the drawings, 1, is the bed of a lathe, which may be of any preferred form in cross-section. However, it is shown in the accompanying drawings as of circular cross-section.

2, represents any ordinary or preferred type of chuck having jaws 3, or other type of work-holders, and adapted for application to the rotating mandrel of a lathe, not shown.

4, is a carriage adjustably mounted on the bed-plate 1, of the lathe and provided with a set screw 5, by means of which it may be clamped to place.

6 and 7, are wings of any required shape pivoted to the carriage 4, in the present instance, by means of a set screw 8, which affords means for clamping them in position.

9, is an opening formed by indentations in the adjacent edges of the wings 6 and 7, and adapted for the accommodation of the work which is held in the jaws 3, of the chuck 2.

The mode of operation of the hereinabove described apparatus is as follows: The carriage 4, is adjusted upon the bed 1, in such manner that the wings 6 and 7, are disposed in front of the chuck 2, whereupon it is clamped to place by means of the set screw 5. The wings 6 and 7, may be then shifted toward each other until the opening 9, is substantially filled by the work. If the wings 6 and 7, have been adjusted for use, it will be obvious that if the tool or graver should slip, it will strike upon and slide off the wings without injury to the tool, graver, chuck, work or person of the user. When the guard is not required for use, the wings may be turned downward and the carriage 4, shifted out of the way of the operator.

It will be obvious to those skilled in the art to which my invention relates that modifications may be made in details without departing from the spirit thereof. Hence I do not limit myself to the precise construction and arrangement of parts hereinabove set forth and illustrated in the accompanying drawings, but

Having thus described the nature and objects of my present invention, what I claim as new, and desire to secure by Letters Patent, is—

1. In combination, a lathe chuck, recessed or indented wings pivoted together and disposed in the same plane to present a flat surface to the tool, and means for clamping said wings, substantially as described.

2. A guard for lathes comprising, the combination of, a carriage adjustable on the lathe bed, a pair of wings pivoted together and indented at their adjacent edges for the accommodation of work, and a set screw for clamping the wings to place on the carriage and in front of the head-stock jaws, substantially as described.

In testimony whereof I have hereunto signed my name.

ROBERT SINGLETON PEABODY.

Witnesses:
ANDREW B. CAMPBELL,
A. B. STOUGHTON.